US012391019B2

(12) United States Patent
Cho et al.

(10) Patent No.: US 12,391,019 B2
(45) Date of Patent: Aug. 19, 2025

(54) CONTAINER AND DISPENSING SYSTEM FOR EXPANDED SLIT PAPER

(71) Applicant: FAGERDALA SINGAPORE PTE LTD, Singapore (SG)

(72) Inventors: Mun Fei Cho, Singapore (SG); Jun Gu, Singapore (SG); Szu Hui Lim, Singapore (SG); Chee Keong Yap, Singapore (SG); George Guicas, West Melbourne (AU)

(73) Assignee: FAGERDALA SINGAPORE PTE LTD, Singapore (SG)

( * ) Notice: Subject to any disclaimer, the term of this patent is extended or adjusted under 35 U.S.C. 154(b) by 144 days.

(21) Appl. No.: 18/266,300

(22) PCT Filed: Dec. 7, 2021

(86) PCT No.: PCT/SG2021/050766

§ 371 (c)(1),
(2) Date: Jun. 9, 2023

(87) PCT Pub. No.: WO2022/124990

PCT Pub. Date: Jun. 16, 2022

(65) Prior Publication Data

US 2024/0043234 A1 Feb. 8, 2024

(30) Foreign Application Priority Data

Dec. 10, 2020 (SG) .......................... 10202012358Y

(51) Int. Cl.
*B31D 5/00* (2017.01)
*B65H 16/00* (2006.01)
*B65H 23/26* (2006.01)

(52) U.S. Cl.
CPC .... *B31D 5/0065* (2013.01); *B65H 2301/4127* (2013.01); *B65H 2301/5124* (2013.01); *B65H 2801/63* (2013.01)

(58) Field of Classification Search
CPC .......... B31D 5/0065; B65H 2301/4127; B65H 2301/5124; B65H 2801/63
See application file for complete search history.

(56) References Cited

U.S. PATENT DOCUMENTS 5,667,871 A 9/1997 Goodrich et al.
5,688,578 A 11/1997 Goodrich
(Continued)

FOREIGN PATENT DOCUMENTS

EP 2877415 B1 8/2017
WO 2017074535 A1 5/2017

*Primary Examiner* — Anna K Kinsaul
*Assistant Examiner* — Nicholas E Igbokwe
(74) *Attorney, Agent, or Firm* — Jon M. Isaacson

(57) ABSTRACT

A dispensing system includes a container, a roll of slit paper, and a passive tension mechanism. The container includes panels and one of the panels includes a dispensing aperture. The slit paper on the roll is in an unexpanded state. The slit paper can be transformed from the unexpanded state to an expanded state by exerting a longitudinal pulling force on the slit paper. The passive tension mechanism is in the container and arranged such that a path of the slit paper from the roll to the dispensing aperture passes through the passive tension mechanism. The passive tension mechanism is configured to induce tension in the slit paper along the path between the roll of the slit paper and the dispensing aperture such that the slit paper transforms from the unexpanded state to the expanded state along the path between the roll of the slit paper and the dispensing aperture.

16 Claims, 7 Drawing Sheets

(56) References Cited

U.S. PATENT DOCUMENTS

| | | | | |
|---|---|---|---|---|
| 5,782,735 | A * | 7/1998 | Goodrich ............. | B31D 1/0031 83/175 |
| D735,488 | S | 8/2015 | Page et al. | |
| D749,871 | S | 2/2016 | Page et al. | |
| 9,376,280 | B2 | 6/2016 | Page et al. | |
| 10,226,907 | B2 | 3/2019 | Goodrich | |
| 2014/0027553 | A1 * | 1/2014 | Page ...................... | B65H 23/06 242/159 |
| 2018/0222665 | A1 * | 8/2018 | Goodrich ................. | B65D 5/02 |
| 2018/0236742 | A1 * | 8/2018 | Cheich ................. | B31D 5/0065 |
| 2018/0281336 | A1 * | 10/2018 | Cheich ................. | B31D 5/0065 |
| 2019/0112125 | A1 * | 4/2019 | Goodrich ................. | B65D 5/42 |
| 2019/0193366 | A1 | 6/2019 | Goodrich | |
| 2020/0039720 | A1 | 2/2020 | Goodrich et al. | |
| 2020/0230908 | A1 * | 7/2020 | Goodrich ............. | B31D 1/0031 |

* cited by examiner

CONTAINER AND DISPENSING SYSTEM FOR EXPANDED SLIT PAPER

BACKGROUND

The present disclosure is in the technical field of dispensers for slit paper. More particularly, the present disclosure is directed to dispensers for slit paper having passive tension mechanisms that induce tension in the slit paper to expand the slit paper as the slit paper is dispensed.

Consumers frequently purchase goods from mail-order or internet retailers, which package and ship the goods to the purchasing consumer via a postal service or other carrier. Millions of such packages are shipped each day. These items are normally packaged in small containers, such as a box or envelope. To protect the items during shipment, they are typically packaged with some form of protective dunnage that may be wrapped around the item or stuffed into the container to prevent movement of the item and to protect it from shock.

Various forms of cushioning and/or void fill material have been developed, including pre-sealed air cellular materials (e.g., BUBBLEWRAP air cellular material sold by Sealed Air Corporation), inflatable air cellular materials (e.g., NEW AIR I.B. air cellular material sold by Sealed Air Corporation), low-density paper cushioning materials (e.g., paper pads formed by PROPAD paper cushioning systems sold by Sealed Air Corporation), and the like. It would be advantageous to provide dispensers of cushioning and/or void fill materials for packers to use when packaging containers for shipping.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a dispensing system includes a container, a roll of slit paper, and a passive tension mechanism. The container has a plurality of panels and a first panel of the plurality of panels includes a dispensing aperture. The slit paper on the roll is in an unexpanded state. The slit paper is capable of being transformed from the unexpanded state to an expanded state by exerting a longitudinal pulling force on the slit paper. The passive tension mechanism is located in the container and arranged such that a path of the slit paper from the roll of the slit paper to the dispensing aperture passes through the passive tension mechanism. The passive tension mechanism is configured to induce tension in the slit paper along the path between the roll of the slit paper and the dispensing aperture such that the slit paper transforms from the unexpanded state to the expanded state along the path between the roll of the slit paper and the dispensing aperture.

In a second embodiment, the passive tension mechanism of the first embodiment is configured to induce a substantially constant amount of tension in the slit paper regardless of the amount of the slit paper remaining on the roll of the slit paper.

In a third embodiment, the passive tension mechanism of any of the previous embodiments is a tortuous path tension mechanism.

In a fourth embodiment, the passive tension mechanism of any of the previous embodiments includes a first rod and a second rod. The first rod is arranged such that the path of the slit paper passes around the first rod in a first direction. The second rod is arranged such that the path of the slit paper passes around the second rod in a second direction that is opposite the first direction after passing around the first rod.

In a fifth embodiment, the first and second rods of the fourth embodiment are static rods that do not rotate with respect to the container.

In a sixth embodiment, the first and second rods of the fourth embodiment are rollers that are configured to rotate with respect to the container.

In a seventh embodiment, the dispensing system of any of the fourth to sixth embodiments is configured such that a distance between an axis of the first rod and the first panel of the container is less than or equal to a distance between an axis of the second rod and the first panel of the container.

In an eighth embodiment, the dispensing system of any of the previous embodiments further includes an insertion assembly configured to be inserted into the container. The insertion assembly is configured to hold the roll of the slit paper in the container.

In a ninth embodiment, the insertion assembly of the eighth embodiment includes first and second roll guides configured to hold sides of a core around which the roll of the slit paper is wound.

In a tenth embodiment, the insertion assembly of the ninth embodiment comprises endcaps inserted through holes in the first and second roll guides and into the sides of the core of the roll of the slit paper.

In an eleventh embodiment, each of the endcaps of the tenth embodiment includes a shaft having a proximal end and a distal end, a collar located at the proximal end of the shaft, and a plurality of slits that are parallel to an axis of the shaft and are spaced apart circumferentially around the distal end of the shaft. The distal end has a larger diameter than the proximal end. The distal end is configured to be inserted into one of the ends of the core of the roll of the slit paper. The collar is configured to abut one of the first and second roll guides.

In a twelfth embodiment, the dispensing system of any of the tenth to eleventh embodiments is configured such that an outer diameter of a shaft of the endcap and an inner diameter of the core of the roll of the slit paper are dimensioned such that the endcap and the core of the roll of the slit paper have an interference fit.

In a thirteenth embodiment, the dispensing system of any of the ninth to eleventh embodiments further includes a roll of interleaf paper located in the container.

In a fourteenth embodiment, the insertion assembly of the thirteenth embodiment includes slots in the first and second roll guides. The slots are configured to configured to receive and hold ends of a core around which the interleaf paper is wound. The slots are further configured to permit the core of the interleaf paper to rotate with respect to the roll guides.

In a fifteenth embodiment, the interleaf paper of any of the thirteenth to fourteenth embodiments is narrower than the slit paper. The insertion assembly further includes at least one spacer located on the roll of the interleaf paper and positioned between the interleaf paper and one of the first and second roll guides.

In a sixteenth embodiment, the at least one spacer of the fifteenth embodiment positions the interleaf paper such that the interleaf paper is substantially centered with respect to the slit paper.

In a seventeenth embodiment, the insertion assembly of the thirteenth embodiment includes slots in the first and second roll guides and a shaft extending between the slots in the first and second roll guides. A core of the roll of the interleaf paper is located around the shaft and the core of the roll of the interleaf paper is configured to rotate with respect to the shaft.

In an eighteenth embodiment, the insertion assembly further includes at least one spacer located on the shaft and positioned between the roll of the interleaf paper and one of the first and second roll guides.

In a nineteenth embodiment, each of the first and second roll guides and the container of any of the ninth to eighteenth embodiments are made from a fiber-based material.

In a twentieth embodiment, the dispensing system of any of the previous embodiments further includes a roll of interleaf paper located in the container. A path of the interleaf paper from the roll of the slit paper to the dispensing aperture passes around the passive tension mechanism.

In a twenty first embodiment, the interleaf paper and the slit paper of the twentieth embodiment are configured to be pulled through the dispensing aperture to simultaneously dispense the slit paper in the expanded state and the interleaf paper.

In a twenty second embodiment, the dispensing system of any of the previous embodiments is configured such that (i) the first panel is a front panel of the container, and (ii) the plurality of panels further comprises a bottom panel, a back panel, two side panels, and a top panel.

In a twenty third embodiment, the front panel of the twenty second embodiment includes a dispensing flap formed by perforated lines along the bottom and sides of the dispensing flap, and wherein the dispensing flap is configured to be pulled out to open the dispensing aperture.

twenty third embodiment, the front panel of the twenty second embodiment includes a dispensing flap formed by perforated lines around a perimeter of the dispensing flap, and wherein the dispensing flap is configured to be removed to open the dispensing aperture.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
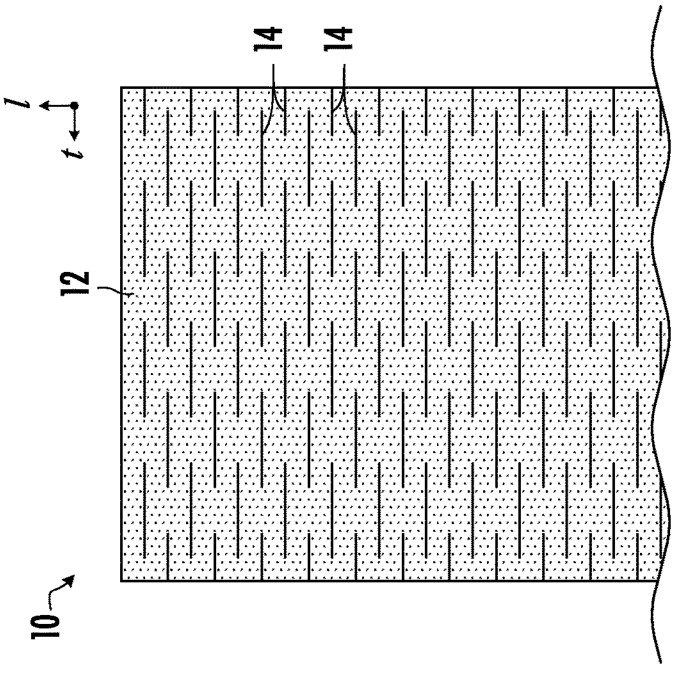
FIG. 1 depicts an embodiment of slit paper material in an unexpanded state.

FIG. 1 depicts an embodiment of slit paper material 10 in an unexpanded state. The slit paper material 10 includes a web 12 of paper or other fiber-based material. In some embodiments, the web 12 is a web of kraft paper. The slit paper material 10 includes rows of slits 14. The slits 14 extend generally in a transverse direction (labelled as the direction t in the drawing) and the slits 14 are arranged in rows that also extend generally in the transverse direction. In the depicted embodiment, each row of slits 14 is offset from the adjacent rows to form a pattern of the rows that repeats generally in the longitudinal direction (labelled as the direction/in the drawing). In the unexpanded state, the slit paper material 10 is generally flat and the slit paper material 10 can be stored in a compact configuration. For example, the slit paper material 10 can be wound into a roll (e.g., around a core), fanfolded into a fanfolded stack, and the like.

Figure 2B:
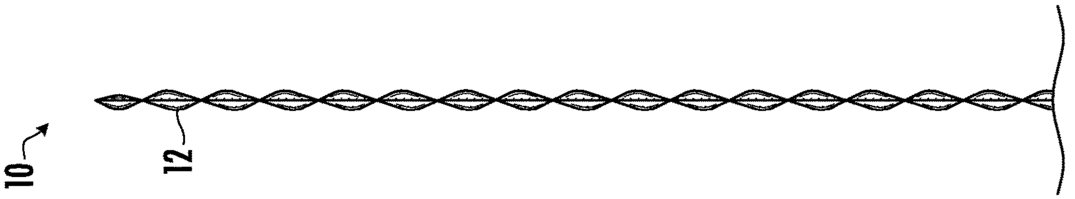
FIGS. 2A and 2B depict front and side views, respectively, of an embodiment of the slit paper material shown in FIG. 1 in an expanded state.
Figure 2A:
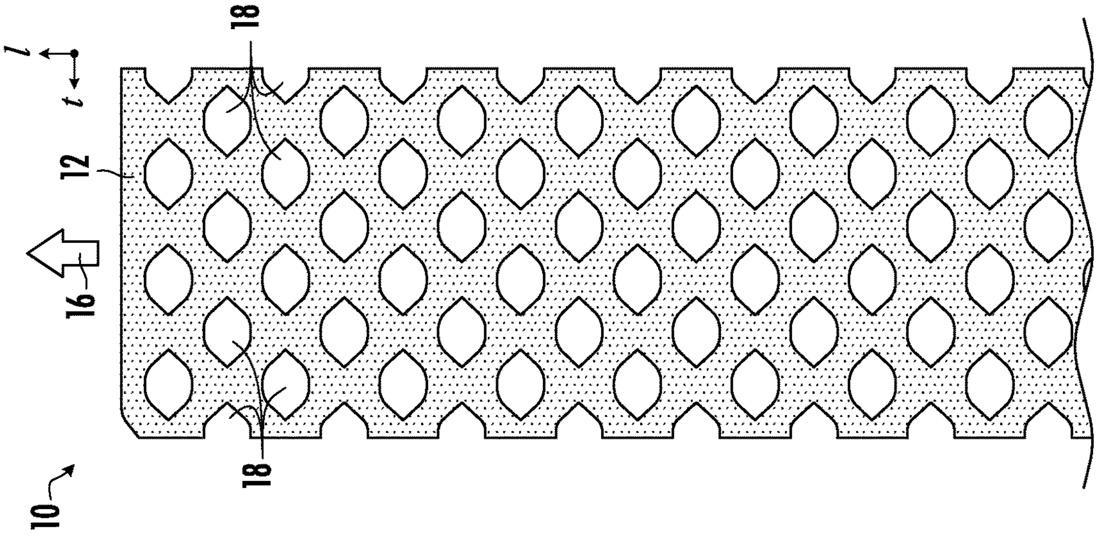

The slit paper material 10 can also be in an expanded state. FIGS. 2A and 2B depict front and side views, respectively, of an embodiment of the slit paper material 10 in an expanded state. In some embodiments, the expanded slit paper material 10 is transformed from the unexpanded state to the expanded state by exerting a longitudinal force 16 on the slit paper material 10. The longitudinal force 16 causes the slits 14 to expand to form open cells 18. The expansion of the slits 14 into the open cells 18 causes the web 12 to buckle and take a three-dimensional shape, as seen in FIG. 2B. The expansion of the slits 14 into the open cells 18 also causes the length of the web 12 to expand in the longitudinal direction and the width of the web 12 to shrink in the transverse direction.

After the slit paper material 10 is in the expanded state, the slit paper material 10 can be wrapped around an object. When wrapped around an object, the slit paper material 10 tends to remain in the expanded state as the wrapping of the object causes at least some portions of the slit paper material 10 to interlock and resist retraction of the slit paper material to the unexpanded state. In some embodiments, an interleaf paper material is layered over the slit paper material 10 and wrapped around the object with the slit paper material 10 to deter retraction of the slit paper material 10. As used herein, an "object" may comprise a single item or a grouping of several distinct items. Further, an object may include any accompanying informational items, such as a packing slip, tracking code, a manifest, an invoice, a machine-readable identifier (e.g., a bar code or a quick response (QR) code) that can be sensed by a reader (e.g., a bar code scanner or a camera), or any other informational item.

The use of expandable slit paper material as a cushioning material is well known. For example, U.S. Pat. No. 5,667,871, issued Sep. 16, 1997, describes the use of slit paper to package objects. In particular, the slit paper is rolled into a roll in its unexpanded state, the roll is placed in a contain, and the slit paper is pulled out of the container. As the slit paper is pulled out of the container, the longitudinal force from pulling the slit paper causes the slit paper to convert from the unexpanded state to the expanded state so that the expanded slit paper can be used as a cushioning material to wrap an object.

When pulling slit paper from a roll in a container, the amount of tension in the slit paper affects the expansion of the slit paper. In one example, too little tension in the slit paper will allow the slit paper to be pulled from the roll in the unexpanded roll. In another example, too much tension in the slit paper will not permit the slit paper to be pulled from the roll without tearing the slit paper. This problem is exacerbated by the use of a roll to hold the slit paper. The amount of resistance needed in the roll to provide the appropriate amount of tension in the slit paper will vary depending on the radius of the roll. However, the radius of the roll varies based on the amount of slit paper remaining on the roll. To address this problem, variable tension devices have been developed to vary the amount of tension in the roll. U.S. Patent Application Publication No. 2019/0193366 A1 provides an example of such a variable tensioning device.

The use of variable tensioning devices in slit paper dispensers can be problematic. First, such variable tensioning devices typically require a user to manually change the level of resistance appropriately based on the amount of slit paper remaining on the roll. This requires training for a user and experience to have the appropriate skill level to properly set the level of resistance, and any such manual operation is subject to user error. Second, variable tensioning can be complex to manufacture and install on a dispenser. Such complexity can be expensive and increase the chances of failure. Third, the materials used in variable tensioning devices are typically not easily recyclable (e.g., curbside recyclable). Having such materials on a dispenser may make the dispenser itself not easily recyclable. It would be advantageous to have a slit paper dispenser that avoids the problems with variable tensioning devices in slit paper dispensers.

Figure 3:
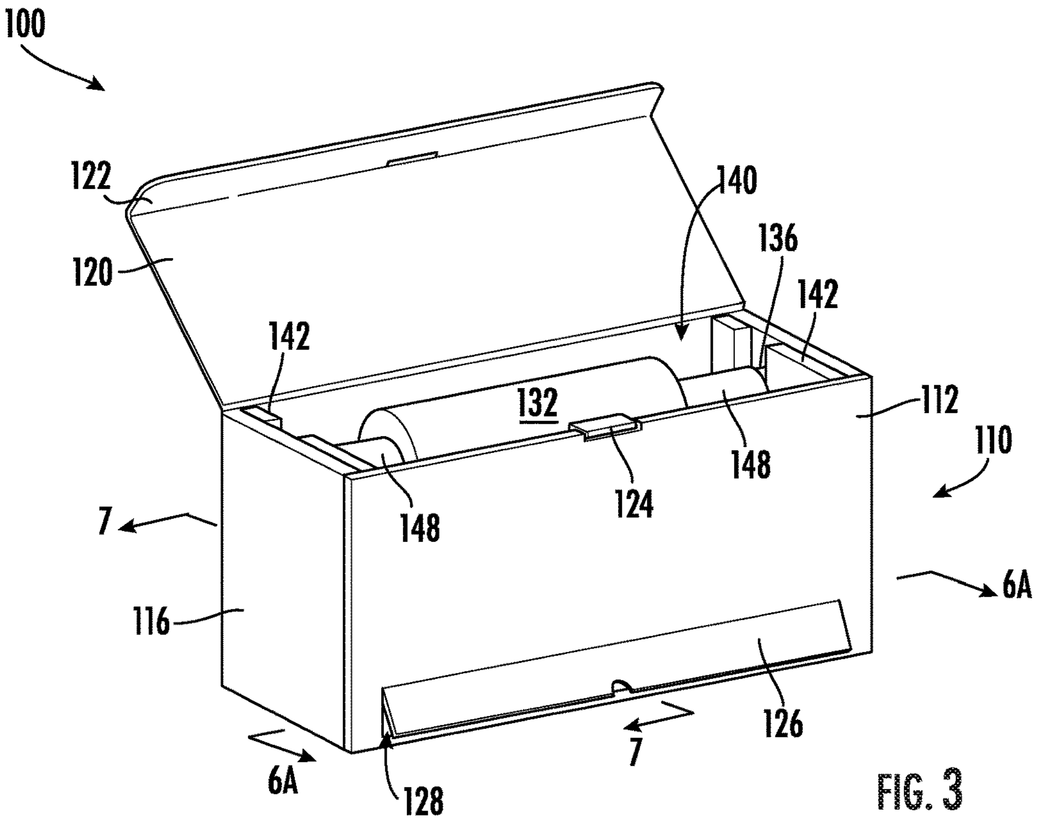
FIG. 3 depicts a perspective view of an embodiment of a dispensing system capable of dispensing expanded slit paper, in accordance with the embodiments disclosed herein.
Figure 4:
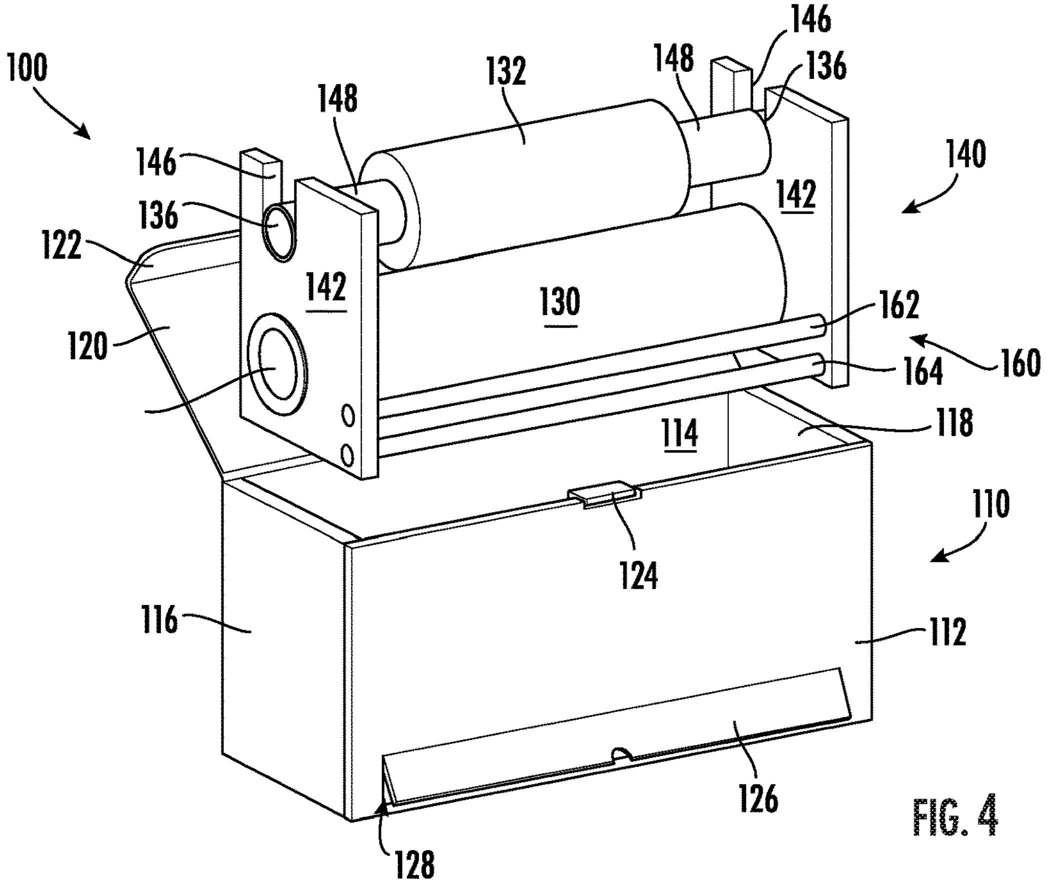
FIG. 4 depicts an exploded perspective view of the embodiment of the dispensing system shown in FIG. 3, in accordance with the embodiments disclosed herein.

FIGS. 3 and 4 depict perspective and exploded perspective views, respectively, of an embodiment of a dispensing system 100 capable of dispensing expanded slit paper. The dispensing system 100 includes a container 110. In the depicted embodiment, the container 110 is a box that includes a front panel 112, a back panel 114, left and right panels 116 and 118, a bottom panel 119, and a top panel 120. In the depicted embodiment, the top panel 120 includes a flap 122 such that, when the top panel 120 is closed, the flap 122 can be slid behind the front panel 112 to close the container 110. The front panel 112 also includes a tab 124 that can be inserted into a slot between the top panel 120 and the flap 122 when the top panel 120 is closed to deter opening of the top panel 120. The front panel 112 also includes a dispensing flap 126. In some embodiments, the dispensing flap 126 is defined by perforated lines in the front panel 112 and an end user pulls the dispensing flap 126 open (e.g., to the open position shown in FIGS. 3 and 4) by pulling on the dispensing flap 126 to break the perforated lines. When the dispensing flap 126 is in the open position shown in FIGS. 3 and 4, the front panel 112 has a dispensing aperture 128 through which webs (e.g., a web of slit paper) can be dispensed from the inside of the container 110, through the dispensing aperture 128, to the outside of the container 110.

The container 110 is configured to hold a supply of slit paper 130 in an unexpanded state. In the depicted embodiment, the container 110 holds a supply of slit paper 130 in the form of a roll of the slit paper 130. In other embodiments, the supply of slit paper 130 can be in other forms, such as a fanfolded stack of the slit paper 130. In some cases, it may be advantageous for the container 110 to hold another web that can be dispensed with the slit paper 130. For example, in the depicted embodiment, the container 110 is configured to hold a supply of interleaf paper 132. As discussed in greater detail below, the container 110 can be used to simultaneously dispense the slit paper 130 and the interleaf paper 132. In the depicted embodiment, the roll of slit paper 130 is located on a core 134 and the roll of interleaf paper 132 is located on a core 136. In some embodiments, the interleaf paper 132 can have information printed thereon, such as custom-printed information (e.g., advertisements, messages, logos, etc.).

In the depicted embodiment, the dispensing system 100 includes an insertion assembly 140 configured to be inserted into the container 110. The insertion assembly 140 is configured to hold the supply of slit paper 130. In embodiments where the dispensing system 100 is also used to dispense the interleaf paper 132, as is the case in the depicted embodiment, the insertion assembly 140 is also configured to hold the supply of interleaf paper 132. In some embodiments, the insertion assembly 140 include roll guides 142. The roll guides 142 are configured to hold the sides of the cores 134 and 136. In the depicted embodiment, the roll guides 142 each include a hole through which endcaps 144 are inserted to engage the ends of the core 134. The endcaps 144 are configure either to rotate with respect to the roll guides 142 and/or to permit the core 134 to rotate with respect to the endcaps 144 such that the slit paper 130 can be withdrawn from the roll by rotating the roll with respect to the roll guides 142 and the container 110. In some embodiments, the endcaps 144 are configured to provide resistance (e.g., frictional resistance) to the rotation of the core 134 such that the roll of the slit paper 130 does not rotate completely freely. Also in the depicted embodiment, the roll guides 142 include slots 146 that are configured to receive the ends of the core 136. The slots 146 in the roll guides 142 are configured to permit the core 136 to rotate with respect to the roll guides 142 such that the interleaf paper 132 can be withdrawn from the roll by rotating the roll with respect to the roll guides 142 and the container 110.

In some embodiments, the interleaf paper 132 is narrower than the slit paper 130. In some embodiments, it may be advantageous for the interleaf paper 132 to be centered with respect to the slit paper 130. In the depicted embodiment, the insertion assembly 140 includes spacers 148 located around the core 136. Each of the spacers 148 is located between the roll of the interleaf paper 132 and one of the roll guides 142. In the depicted embodiment, the spacers 148 have substantially the same width such that the roll of the interleaf paper 132 is centered with respect to the slit paper 130. It will be apparent that the spacers 148 could have different widths such that the interleaf paper 132 is not centered with respect to the slit paper 130. It will be also understood that only one spacer could be used such that the roll of the interleaf paper 132 is side-justified with respect to the slit paper 130.

Figure 5A:
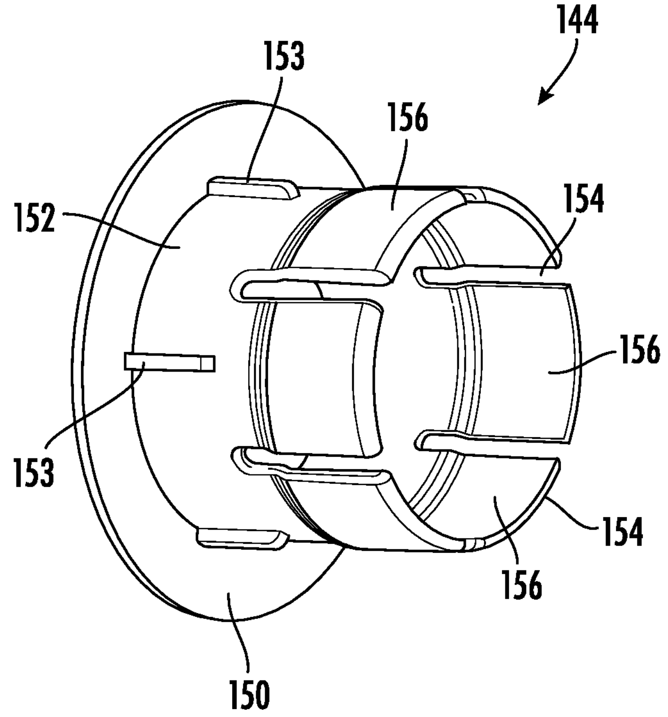
FIG. 5A depicts an embodiment of an endcap that is usable in the dispensing system shown in FIGS. 3 and 4, in accordance with the embodiments disclosed herein.

FIG. 5A depicts an embodiment of one of the endcaps 144 that is usable in the dispensing system 100. The endcap 144 includes a collar 150 and a shaft 152 extending from the collar 150. In use, the shaft 152 of the endcap 144 can be pushed through the hole in the roll guide 142 until the collar abuts the roll guide 142 and the shaft 152 of the endcap 144 can be inserted into the core 134 of the roll of the slit paper 130. In the depicted embodiment, the distal end of the shaft 152 (i.e., the end opposite the collar 150) is larger in diameter than the proximal end of the shaft 152 (i.e., the end at the collar 150). The proximal end of the shaft 152 includes ridges 153 configured to engage the hole in the roll guides 142 to deter rotational movement of the endcap 144 with respect to the roll guides 142 after the endcap 144 is inserted into the hold in the roll guides 154. The distal end of the shaft 152 also has slits 154 that parallel to an axis of the shaft 152 and are spaced apart circumferentially around the distal end of the shaft 152. The portions of the shaft 152 between the slits 154 are tension fingers 156. When the tension fingers 156 engage the inner surface of the core 134, the tension fingers 156 exert a tension force on the core 134 to deter respective movement of the core 134 and the endcap 144 and to increase friction between the core 134 and the endcap 144. In some cases, the outer diameter of the shaft 152 of the endcap 144 and the inner diameter of the core 134 are dimensioned such that the endcap 144 and the core 134 have an interference fit.

Figure 5B:
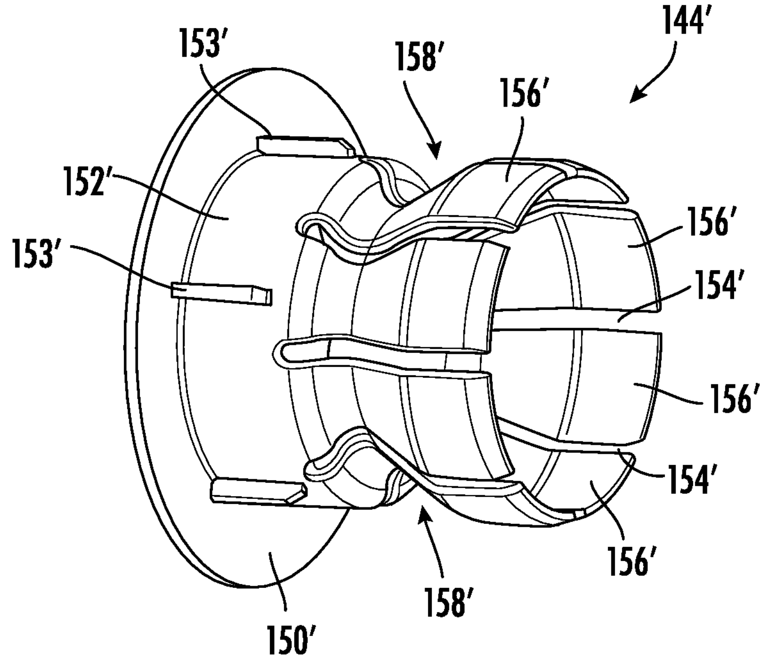
FIG. 5B depicts another embodiment of an endcap that is usable in the dispensing system shown in FIGS. 3 and 4, in accordance with the embodiments disclosed herein.

FIG. 5B depicts another embodiment of an endcap 144' that is usable in the dispensing system 100. The endcap 144' includes a collar 150' and a shaft 152' extending from the collar 150'. In use, the shaft 152' of the endcap 144' can be pushed through the hole in the roll guide 142 until the collar abuts the roll guide 142 and the shaft 152' of the endcap 144' can be inserted into the core 134 of the roll of the slit paper 130. In the depicted embodiment, the distal end of the shaft 152' (i.e., the end opposite the collar 150') is larger in diameter than the proximal end of the shaft 152' (i.e., the end at the collar 150'). The proximal end of the shaft 152' includes ridges 153' configured to engage the hole in the roll guides 142' to deter rotational movement of the endcap 144' with respect to the roll guides 142' after the endcap 144' is inserted into the hold in the roll guides 154'. The distal end of the shaft 152' also has slits 154' that parallel to an axis of the shaft 152' and are spaced apart circumferentially around the distal end of the shaft 152'. The portions of the shaft 152' between the slits 154' are tension fingers 156'. When the tension fingers 156' engage the inner surface of the core 134', the tension fingers 156' exert a tension force on the core 134 to deter respective movement of the core 134 and the endcap 144' and to increase friction between the core 134 and the endcap 144'.

In the depicted embodiment, the shaft 152' includes a narrow section 158' configured to increase the tension applied by the tension fingers 156' to the core 134. In some cases, the core 134 into which the endcap 144' is inserted has deformities in shape (e.g., dents). In some cases, having a greater number of tension fingers 156' (e.g., eight tension fingers 156' instead of the six tension fingers 156 in the endcap 144) can allow the endcap 144' to be inserted into the core 134 while the greater number of tension fingers 156' allows the tension fingers 156' to independently adjust to accommodate the deformities in the core 134.

Figure 6A:
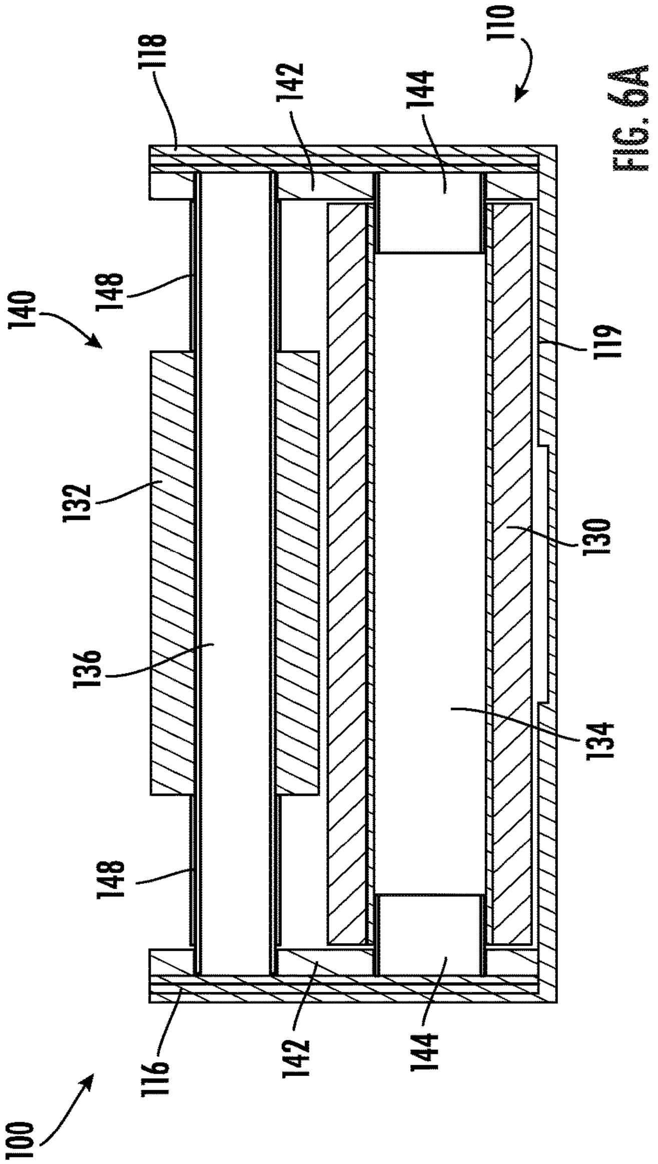
FIG. 6A depicts a front cross-sectional view of the dispensing system shown in FIGS. 3 and 4, including the insertion assembly after having been inserted into the container, in accordance with the embodiments disclosed herein.
Figure 7:
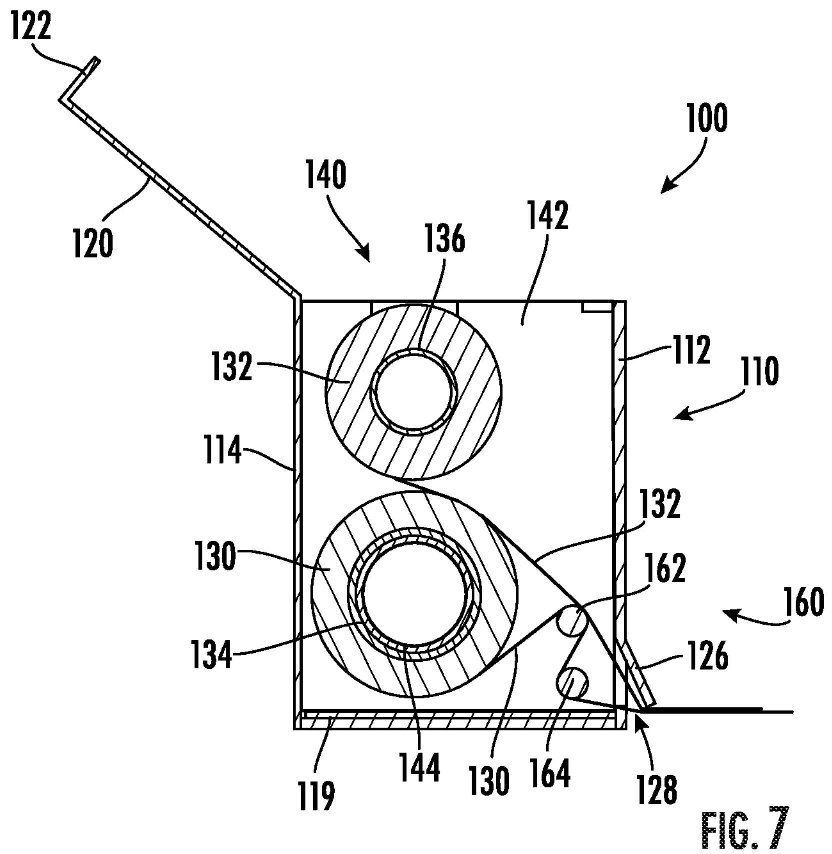
FIG. 7 depicts a side cross-sectional view of the dispensing system shown in FIGS. 3 and 4 and an embodiment of the paths of the slit paper and the interleaf paper from their respective rolls to the dispensing slot, in accordance with the embodiments disclosed herein.

FIGS. 6A and 7 depict front cross-sectional and side cross-sectional views, respectively, of the dispensing system 100, including the insertion assembly 140 after having been inserted into the container 110. In the depicted embodiment, the insertion assembly 140 is arranged such that the roll of the slit paper 130 and the roll of the interleaf paper 132 are substantially aligned in the front-to-back direction (i.e., the direction shown from right to left when viewing FIG. 7). For example, the axes of the rolls of the slit paper 130 and the interleaf paper 132 are the same distances from the front panel 112 and the axes of the rolls of the slit paper 130 and the interleaf paper 132 are the same distances from the back panel 114. It will be understood that the axes of the rolls of the slit paper 130 and the interleaf paper 132 could be offset from each other in the front-to-back direction. For example, the axis of the roll of the interleaf paper 132 could be farther away from the back panel 114 and closer to the front panel 112 than the axis of the roll of the slit paper 130.

Figure 6C:
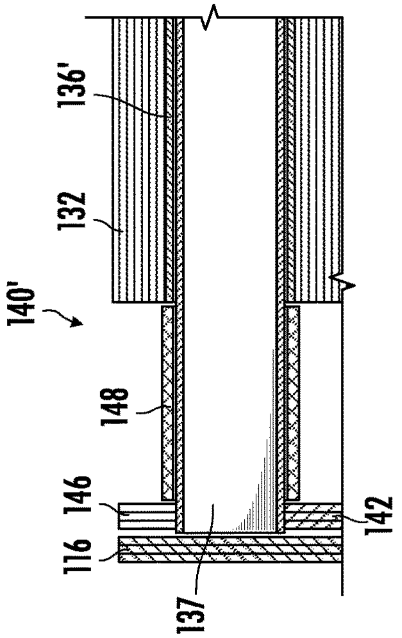
FIG. 6C depicts a partial front cross-sectional view of another embodiment of an insertion assembly, in accordance with the embodiments disclosed herein.
Figure 6B:
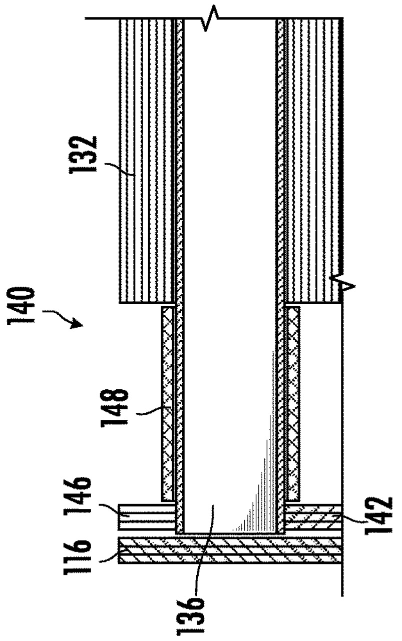
FIG. 6B depicts a partial front cross-sectional view of the insertion assembly shown in FIG. 6A, in accordance with the embodiments disclosed herein.

FIG. 6B depicts a partial front cross-sectional view of the insertion assembly 140. In the depicted embodiment, the core 136 is wider than the interleaf paper 132 and extends into the slots 146 of the roll guides 142. The spacers 148 are located around the core 136 of the interleaf paper 132. In this embodiment, the interleaf paper 132 is unwound by pulling on the interleaf paper 132 to cause the core 136 to rotate with respect to the slots 146 and the roll guides. FIG. 6C depicts a partial front cross-sectional view of another embodiment of an insertion assembly 140'. The insertion assembly 140' is similar to the insertion assembly 140 except that the insertion assembly 140' includes a core 136' of the interleaf paper 132 that had a similar width to the interleaf paper 132 itself. The insertion assembly 140' also includes a shaft 137 that extends into the slots 146 of the roll guides 142. The core 136' of the interleaf paper 132 is located around the shaft 137 and the core 136' is configured to rotate with respect to the shaft 137. The spacers 148 are also located around the shaft 137. In this embodiment, the interleaf paper 132 is unwound by pulling on the interleaf paper 132 to cause the core 136' to rotate with respect to the shaft 137. In some cases, the arrangement of the insertion assembly 140' may be preferable because it may be easier to properly align the interleaf paper 132 on the core 136' because they have substantially similar widths than to align the interleaf paper 132 on the core 136 when they have substantially different widths.

An embodiment of the paths of the slit paper 130 and the interleaf paper 132 from their respective rolls to the dispensing aperture 128 is depicted in FIG. 7. In the depicted embodiment, the slit paper 130 is withdrawn from the bottom of the roll and the slit paper 130 passes through a passive tension mechanism 160 before the slit paper 130 passes through the dispensing aperture 128. The passive tension mechanism 160 is arranged to induce tension in the slit paper 130 as the slit paper 130 passes through the passive tension mechanism 160. In some embodiments, the passive tension mechanism 160 is configured to induce a substantially constant amount of tension in the slit paper 130 regardless of the amount of the slit paper 130 remaining on the roll. In some embodiments, the term "passive" is used to mean one or more of an unpowered tension mechanism, a non-variable tension mechanism, and/or a tension mechanism that is not adjustable by an end user of the dispensing system.

In some embodiments, the passive tension mechanism 160 is a tortuous path tension mechanism. In the depicted embodiment, the passive tension mechanism 160 includes a rod 162 and a rod 164. The slit paper 130 is fed from the bottom of the roll of the slit paper 130 around the back, top, and front of the rod 162 in a first direction (e.g., clockwise when viewing FIG. 7). The slit paper 130 is then fed around the back and bottom of the rod 164 in a second direction that is opposite the first direction (e.g., counterclockwise when viewing FIG. 7) before passing to and through the dispensing aperture 128. The tortuous path through the passive tension mechanism 160 causes tension to be induced in the slit paper 130 such that the slit paper expands from an unexpanded state to an expanded state during and/or after the slit paper 130 passes through the passive tension mechanism 160. In this way, the slit paper 130 is in the expanded state when the slit paper 130 passes through the dispensing aperture 128. In the depicted embodiment, the profile of the tortuous path is an "S" shape.

In the depicted embodiment, the rods 162 and 164 of the passive tension mechanism 160 are formed as a part of the insertion assembly 140. In this way, as the insertion assembly 140 is inserted into the container 110, the passive tension mechanism 160 is also inserted into the container 110. In other embodiments, the rods 162 and 164 of the passive tension mechanism 160 can be formed as a part of the container 110 such that the passive tension mechanism 160 is not inserted into or removed from the container 110 as the insertion assembly 140 is inserted into and removed from the container 110. In some embodiments, the rods 162 and 164 can be hollow paper core structures, such as curbside recyclable hollow paper core structures.

In embodiments where the passive tension mechanism 160 includes the rods 162 and 164, the rods 162 and 164 can take a variety of forms. In some embodiments, the rods 162 and 164 are static rods that do not rotate with respect to the container 110 and/or the insertion assembly 140. Where the rods 162 and 164 are static rods, the movement of the slit paper 130 over the rods 162 and 164 causes friction between the slit paper 130 and the rods 162 and 164. This friction as the slit paper 130 is being pulled induces the tension in the slit paper 130. In some embodiments, the rods 162 and 164 are rollers that rotate with respect to the container 110 and/or the insertion assembly 140. In some examples, the rollers rotate substantially freely with respect to the container 110 and/or the insertion assembly 140. When the rods 162 and 164 are rollers, there will be less friction between the slit paper 130 and the rods 162 and 164 as the slit paper 130 is pulled through the passive tension mechanism 160. However, the tortuous path of the passive tension mechanism 160 still induces tension in the slit paper 130 as the slit paper 130 is pulled through the passive tension mechanism 160.

In the embodiment shown in FIG. 7, the axes of the rods 162 and 164 are substantially aligned in the front-to-back direction (the direction from right to left when viewing FIG. 7). For example, the axes of the rolls of the rods 162 and 164 are the same distances from the front panel 112 and the axes of the rolls of the rods 162 and 164 are the same distances from the back panel 114. This arrangement can provide sufficient tension in the slit paper 130 to cause the slit paper to expand to the expanded state before the slit paper 130 passes through the dispensing aperture 128.

The interleaf paper 132 is fed to the dispensing aperture 128 without inducing a significant amount of tension in the interleaf paper 132. In the depicted embodiment, the interleaf paper 132 comes off of the bottom of the roll and proceeds on a path around the roll of the slit paper 130 and around the passive tension mechanism 160 before passing through the dispensing aperture 128. In the depicted embodiment, the interleaf paper 132, on its path from the roll of the interleaf paper 132 to the dispensing aperture 128, contacts both the roll of the slit paper 130 and the portion of the slit paper 130 that passes around the rod 162. The path of the interleaf paper 132 allows the slit paper 130 and the interleaf paper 132 to be pulled through the dispensing aperture 128 together while sufficient tension is induced in the slit paper 130 to expand the slit paper and while the interleaf paper 132 does not receive enough tension to tear or damage the interleaf paper 132.

Figure 8:
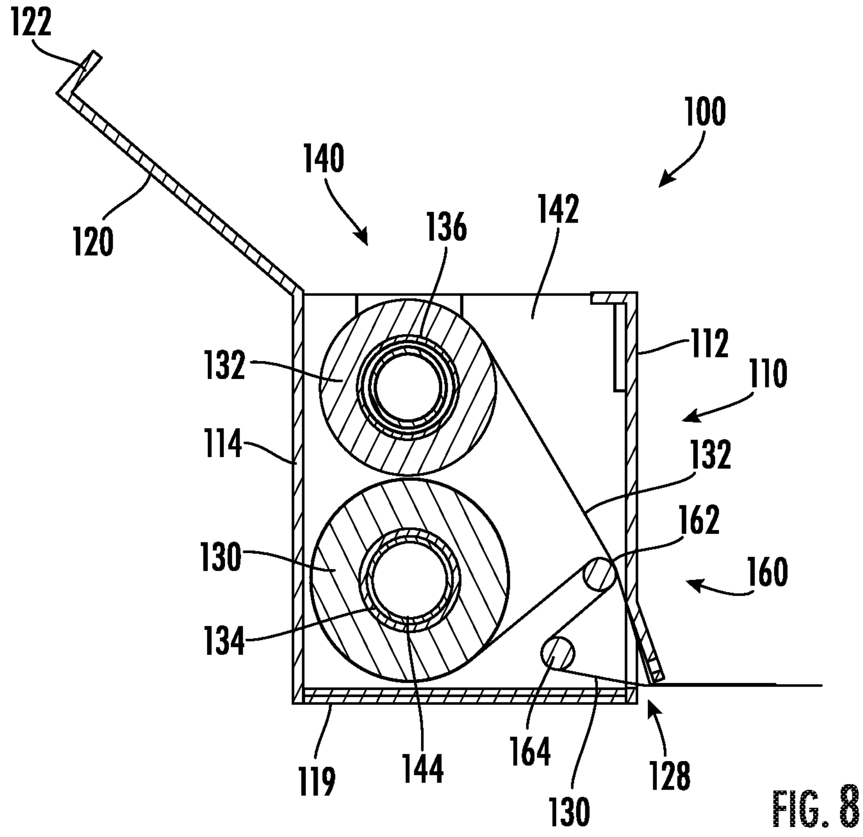
FIG. 8 depicts a side cross-sectional view of an alternative embodiment of the dispensing system shown in FIGS. 3 and 4 and another embodiment of the paths of the slit paper and the interleaf paper from their respective rolls to the dispensing slot, in accordance with the embodiments disclosed herein.

FIG. 8 depicts a side cross-sectional view of another embodiment of the dispensing system 100. The embodiment shown in FIG. 8 is similar to the embodiment shown in FIG. 7, except for the positioning of the rods 162 and 164 and the path of the interleaf paper 132 from the roll of the interleaf paper 132 to the dispensing aperture 128. In the embodiment shown in FIG. 8, the rods 162 and 164 are not substantially aligned in the front-to-back direction. In particular, the rod 162 is located closer to the front panel 112 than the rod 164 is located to the front panel. The arrangement of the rods 162 and 164 in this embodiment (as compared to the arrangement of the rods 162 and 164 in the embodiment shown in FIG. 7) provides an even more tortuous path for the slit paper 130 through the passive tension mechanism 160. Such an arrangement can increase the tension induced in the slit paper 130 and/or provide greater consistency in the tension induced in the slit paper 130.

In FIG. 8, the interleaf paper 132 feeds off of the top of the roll of the interleaf paper 132. The interleaf paper 132 is fed around the passive tension mechanism 160 to the dispensing aperture 128. On the path from the roll of the interleaf paper 132 to the dispensing aperture 128, the interleaf paper 132 contacts the portion of the slit paper 130 that passes around the rod 162, but the interleaf paper 132 does not contact the roll of slit paper. This path of the interleaf paper 132 also causes the rolls of the slit paper 130 and the interleaf paper 132 to counterrotate as the slit paper 130 and the interleaf paper 132 are withdrawn from the rolls.

Figure 9:
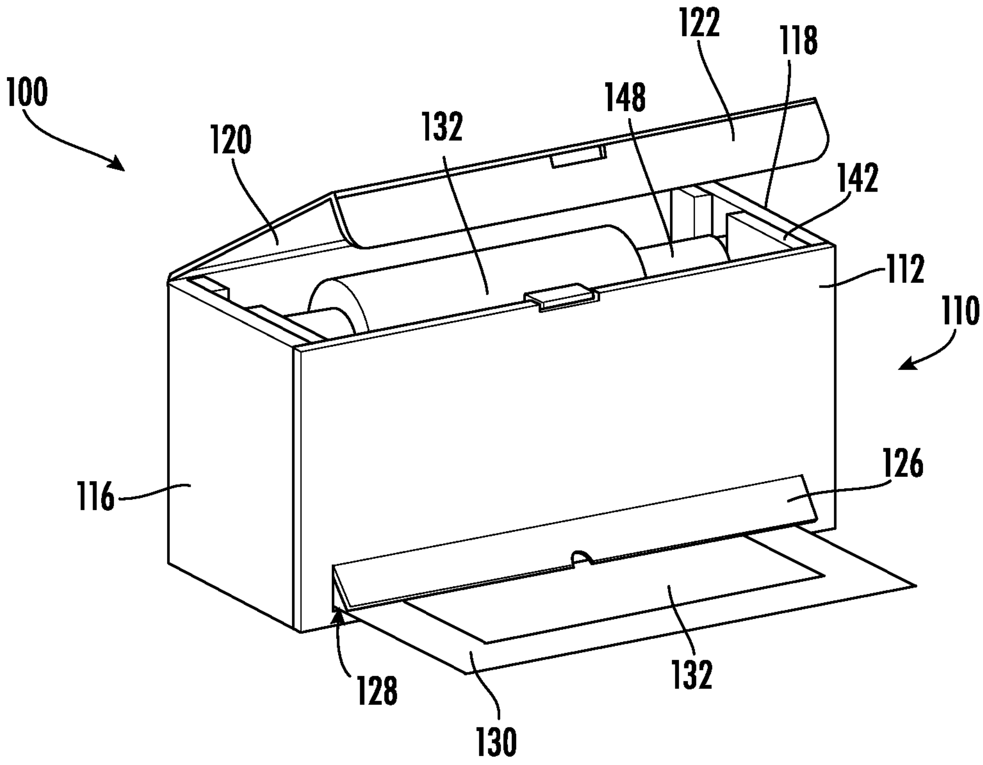
FIG. 9 depicts a perspective view of the dispensing system shown in FIGS. 3 and 4 while the slit paper and the interleaf paper are being dispensed through the dispensing slot, in accordance with the embodiments disclosed herein.
Figure 10:
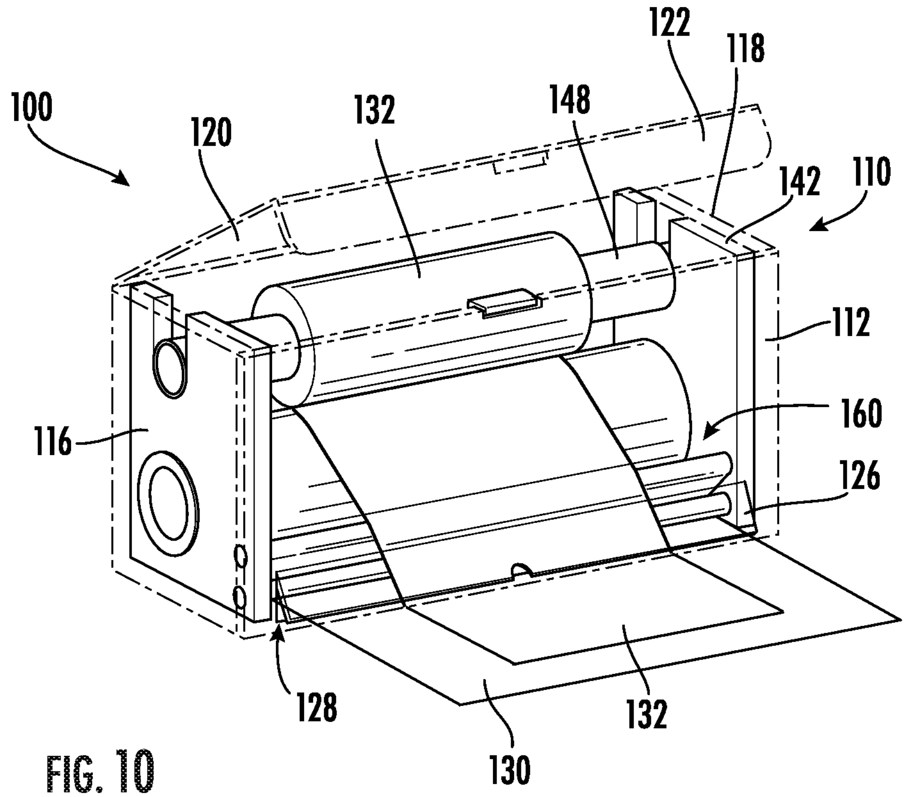
FIG. 10 depicts a partially-hidden perspective view of the dispensing system shown in FIGS. 3 and 4 while the slit paper and the interleaf paper are being dispensed through the dispensing slot, in accordance with the embodiments disclosed herein.

FIGS. 9 and 10 show perspective and partially-hidden perspective views, respectively, of the dispensing system 100 while the slit paper 130 and the interleaf paper 132 are being dispensed through the dispensing aperture 128. The slit paper 130 and the interleaf paper 132 are being dispensed through the dispensing aperture 128 as shown in FIGS. 9 and 10 using both the embodiment of the passive tension mechanism 160 shown in FIG. 7 and the embodiment of the passive tension mechanism 160 shown in FIG. 8. To dispense the slit paper 130 and the interleaf paper 132, a user can grasp the ends of the slit paper 130 and the interleaf paper 132 and pull them through the dispensing aperture 128. As this pulling force is applied, the combination of the pulling force and the tension induced by the passive tension mechanism 160 causes the slit paper 130 exiting the container 110 through the dispensing aperture 128 to be in the expanded state. The pulling force can also pull the interleaf paper 132 without ripping or tearing the interleaf paper 132. When the user determines that sufficient amounts of the slit paper 130 and the interleaf paper 132 have been pulled out for packaging an object, the user can tear or cut both the slit paper 130 and the interleaf paper 132 to break off the slit paper 130 and the interleaf paper 132 from the webs of the slit paper 130 and the interleaf paper 132.

The embodiments of dispensing systems depicted herein include both a roll of slit paper and a roll of interleaf paper. It will be understood that, while the inclusion of the interleaf paper may be advantageous in certain circumstances, slit paper can be used without interleaf paper. Thus, the interleaf paper in all of the embodiments depicted and discussed herein will be understood to be an optional feature of the dispensing system. It will also be understood that any of the dispensing systems described herein could be modified such that the only roll held within the dispensing system is a roll of slit paper.

One of the advantages of using slit paper 130 as a cushioning material is that the slit paper 130 is easily recyclable for end consumers. In many jurisdictions (e.g., municipalities, counties, etc.), slit paper can be recycled by an end user by simply placing the slit paper in curbside recycling bins. This ease of recyclability is appealing to suppliers and consumers alike who want to lessen the impact of their packaging materials on the environment. In some cases, it would also appealing not only for the slit paper itself to be easily recyclable but also for the dispenser itself to be made from easily-recyclable materials. For example, in the embodiment of the dispensing system 100, each of the container 110, the cores 134 and 136, the roll guides 142, and the spacers 148 can be made from fiber-based materials, such as cardboard, paperboard, kraft paper, cardstock, and the like. Cardboard materials may comprise corrugated cardboard, such as any of single-wall B-flute, C-flute, and/or E-flute corrugated cardboard, B/C double-wall corrugated cardboard, E/B double-wall corrugated cardboard, or any combination thereof. In this way, when the rolls of the slit paper 130 and the interleaf paper 132 are exhausted, most parts of the dispensing system 100 can be recycled in the same way that paper products are recycled. While most parts of the dispensing system 100 can be made from fiber-based materials, some of the part can be made from other materials. For example, one or more parts (e.g., the endcaps 144) can be formed from another materials. In some embodiments, the endcaps 144 are made from plastic. In some embodiments, the rods 162 and 164 are made from one of a fiber-based material, a wood material, and/or a metal material. In some embodiments, not all components of the dispensing system 100 can be made from fiber-based materials. For example, the endcaps 144 may not work as desired if they are made from fiber-based materials. In those cases, it may be advantageous to use a polymer material that is easily recyclable and/or formed from recycled materials, such as polypropylene. In other cases, the endcaps 144 can be omitted, such as in the case where the core 134 of the slit paper 130 extends beyond the ends of the slit paper 130 to directly engage the roll guides 142 (e.g., similar to how the core 136 of the interleaf paper 132 directly engages the roll guides 142).

In some embodiments, it may also reduce waste for the container 110 to be used to ship and/or distribute the slit paper 130 and, when included, the interleaf paper 132. For example, the container 110 can be made from cardboard and form a cardboard box. The container can be closed for shipping and/or distributing the dispensing system 100. The dispensing flap 126 can be formed in the front panel by perforated lines along the bottom and sides of the dispensing flap 126. When an end user receives the dispensing system, the user can break the perforated lines of the dispensing flap 126 and pull the dispensing slot to the position shown in FIGS. 9 and 10 in order to open the dispensing aperture 128. In some embodiments, it may be advantageous for the end of the slit paper 130 (and the end of the interleaf paper 132, when included) to be releasably connected (e.g., taped) to the inside of the dispensing flap 126. In this way, when the user opens the dispensing aperture 128, the end of the slit paper 130 and/or the end of the interleaf paper 132 can easily be released and pulled through the dispensing aperture 128 to begin dispensing the slit paper 130 and/or the interleaf paper 132. The user can then dispense the slit paper 130 until the roll is exhausted, at which point any of the recyclable materials of the dispensing system 100 can be recycled.

Figure 11:
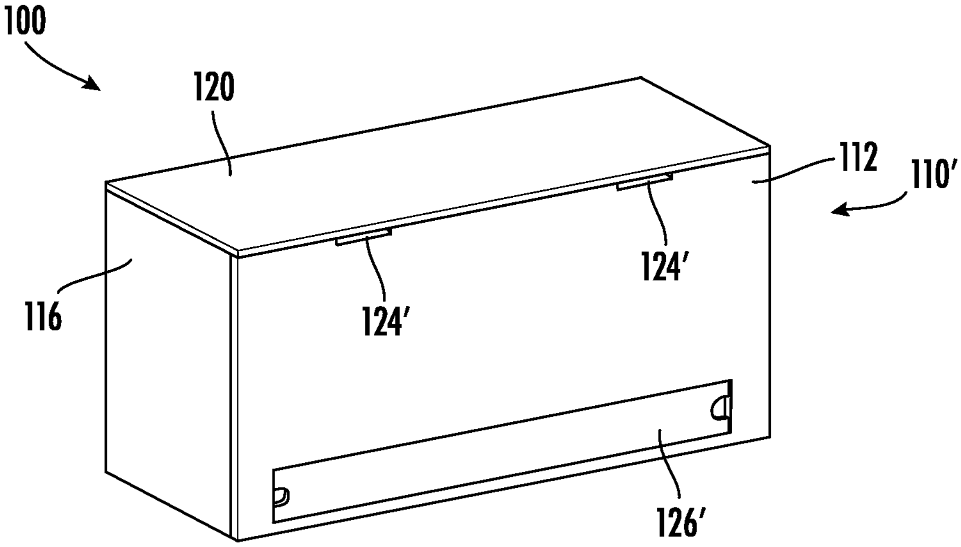
FIG. 11 depicts a perspective view of an embodiment of a dispensing system capable of dispensing expanded slit paper with the dispensing system in a closed condition, in accordance with the embodiments disclosed herein.
Figure 12:
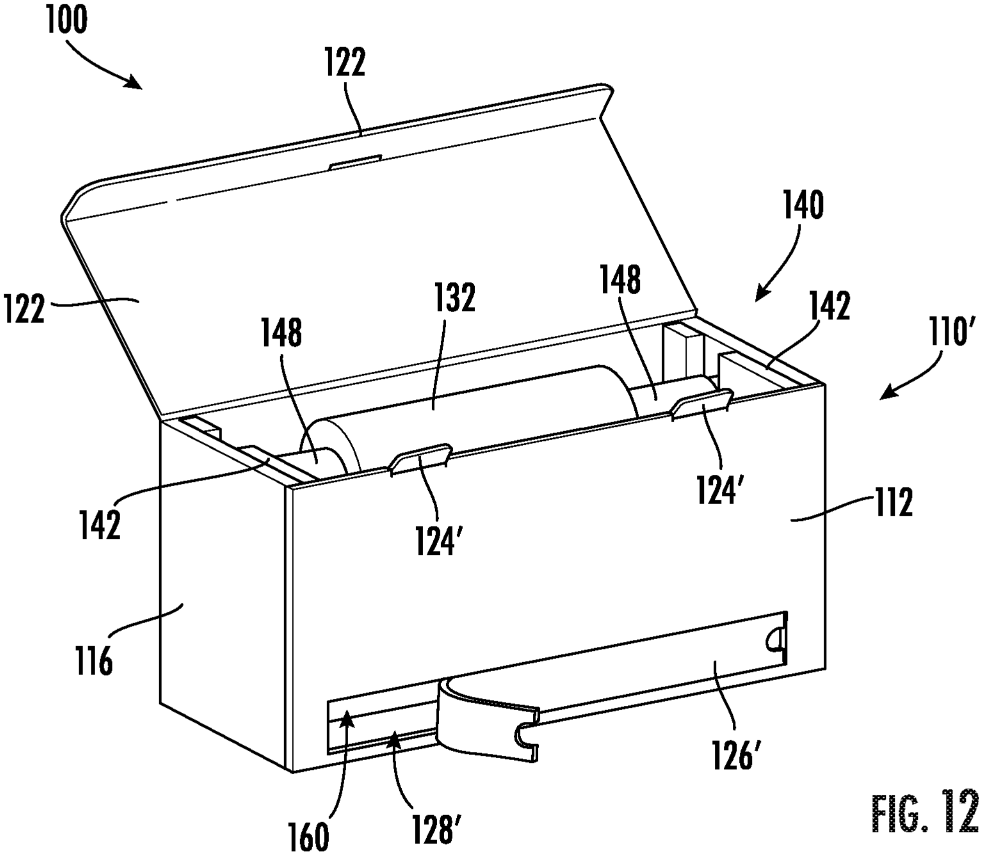
FIG. 12 depicts a perspective view of the dispensing system shown in FIG. 11 with the dispensing system in an open condition, in accordance with the embodiments disclosed herein.

FIGS. 11 and 12 depict perspective of an embodiment of a dispensing system 100' capable of dispensing expanded slit paper in closed and open conditions, respectively. The dispensing system 100' includes a container 110', which is a variation of the container 110. In the depicted embodiment, the container 110' is a box that includes the front panel 112, the back panel 114, the left and right panels 116 and 118, the bottom panel 119, the top panel 120, and the flap 122. In FIG. 11, the container 110' is in a closed condition with the top panel 120 closed. In FIG. 12, the container 110' is in an open condition with the top panel 120 open. The front panel 112 also includes tabs 124' that are inserted into slots between the top panel 120 and the flap 122 when the top panel 120 is closed to deter opening of the top panel 120. It will be apparent that any number of tabs 124' can be used in any of the embodiments described herein.

The front panel 112 also includes a dispensing flap 126'. In some embodiments, the dispensing flap 126' is defined by perforated lines in the front panel 112 and an end user removes the dispensing flap 126' from the front panel 112 by tearing the perforated lines. FIG. 11 shows the dispensing flap 126' with perforated lines around the perimeter of the dispensing flap 126'. FIG. 12 shows the dispensing flap 126' in the process of being removed from the front panel 112. When the dispensing flap 126' is full removed from the front panel 112, the front panel 112 has a dispensing aperture 128' through which a web of slit paper and/or a web of interleaf paper can be dispensed from the inside of the container 110', through the dispensing aperture 128', to the outside of the container 110'. In the depicted embodiment, the dispensing system 100' includes the supply of slit paper 130, the supply of interleaf paper 132, and the insertion assembly 140.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A dispensing system, comprising:

a container having a plurality of panels, wherein a first panel of the plurality of panels includes a dispensing aperture;

a roll of slit paper, wherein the slit paper on the roll is in an unexpanded state, and wherein the slit paper is capable of being transformed from the unexpanded state to an expanded state by exerting a longitudinal pulling force on the slit paper; and a passive tension mechanism located in the container and arranged such that a path of the slit paper from the roll of the slit paper to the dispensing aperture passes through the passive tension mechanism;

wherein the passive tension mechanism is configured to induce tension in the slit paper along the path between the roll of the slit paper and the dispensing aperture such that the slit paper transforms from the unexpanded state to the expanded state along the path between the roll of the slit paper and the dispensing aperture;

wherein the passive tension mechanism includes:

a first rod arranged such that the path of the slit paper passes around the first rod in a first direction, and a second rod arranged such that the path of the slit paper passes around the second rod in a second direction that is opposite the first direction after passing around the first rod;

wherein the first and second rods are static rods that do not rotate with respect to the container.

2. The dispensing system of claim 1, wherein the passive tension mechanism is configured to induce a substantially constant amount of tension in the slit paper regardless of the amount of the slit paper remaining on the roll of the slit paper.

3. The dispensing system of claim 1, wherein the passive tension mechanism is a tortuous path tension mechanism.

4. The dispensing system of claim 1, wherein a distance between an axis of the first rod and the first panel of the container is less than or equal to a distance between an axis of the second rod and the first panel of the container.

5. The dispensing system of claim 1, further comprising:

an insertion assembly configured to be inserted into the container, wherein the insertion assembly is configured to hold the roll of the slit paper in the container.

6. The dispensing system of claim 5, wherein the insertion assembly comprises:

first and second roll guides configured to hold sides of a core around which the roll of the slit paper is wound.

7. The dispensing system of claim 6, wherein the insertion assembly comprises endcaps inserted through holes in the first and second roll guides and into the sides of the core of the roll of the slit paper.

8. The dispensing system of claim 7, wherein each of the endcaps includes:

a shaft having a proximal end and a distal end, wherein the distal end has a larger diameter than the proximal end;

a collar located at the proximal end of the shaft; and a plurality of slits that are parallel to an axis of the shaft and are spaced apart circumferentially around the distal end of the shaft;

wherein the distal end is configured to be inserted into one of the ends of the core of the roll of the slit paper; and wherein the collar is configured to abut one of the first and second roll guides.

9. The dispensing system of claim 6, wherein each of the first and second roll guides and the container are made from a fiber-based material.

10. The dispensing system of claim 1, further comprising:

a roll of interleaf paper located in the container;

wherein a path of the interleaf paper from the roll of the slit paper to the dispensing aperture passes around the passive tension mechanism.

11. The dispensing system of claim 1, wherein:

the first panel is a front panel of the container; and the plurality of panels further comprises a bottom panel, a back panel, two side panels, and a top panel.

12. The dispensing system of claim 11, wherein the front panel includes a dispensing flap that is formed by one of:

perforated lines along the bottom and sides of the dispensing flap, wherein the dispensing flap is configured to be pulled out to open the dispensing aperture, or perforated lines around a perimeter of the dispensing flap, wherein the dispensing flap is configured to be removed to open the dispensing aperture.

13. A dispensing system, comprising:

a container having a plurality of panels, wherein a first panel of the plurality of panels includes a dispensing aperture;

a roll of slit paper, wherein the slit paper on the roll is in an unexpanded state, and wherein the slit paper is capable of being transformed from the unexpanded state to an expanded state by exerting a longitudinal pulling force on the slit paper;

a passive tension mechanism located in the container and arranged such that a path of the slit paper from the roll of the slit paper to the dispensing aperture passes through the passive tension mechanism; and a roll of interleaf paper located in the container;

wherein the passive tension mechanism is configured to induce tension in the slit paper along the path between the roll of the slit paper and the dispensing aperture such that the slit paper transforms from the unexpanded state to the expanded state along the path between the roll of the slit paper and the dispensing aperture;

wherein the insertion assembly comprises:

slots in the first and second roll guides, and a shaft extending between the slots in the first and second roll guides, wherein a core of the roll of the interleaf paper is located around the shaft and the core of the roll of the interleaf paper is configured to rotate with respect to the shaft;

wherein the insertion assembly further comprises:

at least one spacer located on the shaft and positioned between the roll of the interleaf paper and one of the first and second roll guides.

14. The dispensing system of claim 13, wherein the slots are configured to permit the core of the interleaf paper to rotate with respect to the roll guides.

15. The dispensing system of claim 13, wherein the interleaf paper is narrower than the slit paper.

16. The dispensing system of claim 15, wherein the at least one spacer positions the interleaf paper such that the interleaf paper is substantially centered with respect to the slit paper.

* * * * *